United States Patent
Belli

[11] Patent Number: 5,091,248
[45] Date of Patent: Feb. 25, 1992

[54] COMPOSITION FOR PRECLUDING SEPARATION OF NONDIRECTIONAL FIBERS FROM SURFACE OF DRUMHEAD LAMINATE

[75] Inventor: Remo D. Belli, North Hollywood, Calif.

[73] Assignee: Remo, Inc., N. Hollywood, Calif.

[21] Appl. No.: 631,199

[22] Filed: Dec. 20, 1990

Related U.S. Application Data

[63] Continuation-in-part of Ser. No. 483,897, Feb. 23, 1990, abandoned.

[51] Int. Cl.⁵ ............................................. B32B 27/04
[52] U.S. Cl. .................................. 428/290; 428/518; 84/414
[58] Field of Search ............... 428/287, 290, 520, 518; 84/414

[56] References Cited

U.S. PATENT DOCUMENTS

| | | | |
|---|---|---|---|
| 3,432,340 | 3/1969 | Mathis | 117/132 |
| 3,702,785 | 11/1972 | Knechtges | 117/155 |
| 3,706,595 | 12/1972 | Drelich | 117/38 |
| 4,044,180 | 8/1977 | Baker | 428/287 |
| 4,308,782 | 1/1982 | Hartry | 84/414 |
| 4,374,894 | 2/1983 | Antefruger | 428/288 |
| 4,446,177 | 5/1984 | Munoz et al. | 428/483 |
| 4,742,753 | 5/1988 | Speed | 84/414 |
| 4,779,508 | 10/1988 | Beals | 84/414 |
| 4,892,782 | 1/1990 | Fisher et al.1 | 428/242 |

FOREIGN PATENT DOCUMENTS 1108547  5/1986  Japan .

Primary Examiner—Merrell C. Cashion, Jr.
Assistant Examiner—Robert J. Follett
Attorney, Agent, or Firm—Rapkin, Gitlin & Moser

[57] ABSTRACT

A lamination comprising an upper fabric layer made of nonorientated polyester fibers, a lower plastic layer, and a substance which, when applied to the surface of the polyester fabric, creates a seal thereon and impregnates the material acting to further create a bond among and between the polyester fibers to preclude delamination of the fibers when the fabric surface is exposed to the constant pounding of drumsticks or the continuous circular and sweeping motion of a drum brush.

8 Claims, 1 Drawing Sheet

COMPOSITION FOR PRECLUDING SEPARATION OF NONDIRECTIONAL FIBERS FROM SURFACE OF DRUMHEAD LAMINATE

FIELD OF INVENTION

The present invention relates generally to the area of drumhead construction and, more particularly, to a head for a drum that includes a synthetic plastic sheet material, a polyester fabric material laminated thereto and a copolymer coating applied to seal the fabric material and impregnate and preclude delamination of the randomly orientated fibers therein.

Drumheads of a variety of types are well known in the prior art. A pertinent and interesting discussion of the prior art in this area is contained in Hartry, U.S. Pat. No. 4,308,782. The principal improvement claimed in Hartry is the laminated drumhead comprising a synthetic fabric material of continuous filament polyethylene fibers, also known as spunbonded olefins, that are randomly arranged, which acts to distribute load without transferring stress and provides an improved brush surface, and a synthetic plastic sheet material, which acts as the primary load carrier. Though clearly a substantial improvement over the prior art, the Hartry invention did not address a very critical problem in the technology relative to the delamination of the nonorientated polyethylene fibers in the fabric material.

Polyethylene fibers or spunbonded olefins have often been the material of choice in the prior art for use in the construction of drumhead laminates. The material is extremely versatile for use in many applications and, because of its strength, lightweight and smooth finish, has been adopted for use in the manufacture of drumheads and related products. However, because a drumhead is subjected to constant stressful pounding, it will normally suffer from a high degree of surface delamination after time. In large part, this is due to polyethylene's characteristic lack of liquid absorbency contributing to the difficulty in the bonding between the polyethylene fibers and the copolymer coating, which is introduced as an essential ingredient to contribute additional bonding strength and offer greater resistance to water and gas infiltration. Thus, as the drum brush strokes the polyethylene fabric surface in a circular or sweeping motion, the fibers eventually come apart and separate from the drumhead surface, forming elevated hairlike filaments in which the wire or nylon bristles of the drum brush become entangled. Separation of the polyethylene fibers also occurs as a result of the constant pounding of the drumstick upon the fabric surface. The tonal quality of the drumhead is thus negatively affected and the usefulness of the drum brush as a drum instrument clearly diminishes. Efforts to solve the delamination problem, including the application of a wide variety of plastic coatings on the polyethylene fabric surface, have failed. The fibers within the fabric separate irrespective.

The present invention solves the aforesaid problem by utilizing a combination of elements, including polyester fabrics and a polyvinylidene chloride copolymer, which were previously unknown and unexplored in the drumhead technology and which also, when working in concert, succeed to maintain both the integrity of the laminated drumhead, including the preservation of the requisite degree of tonality for drums and similar types of instruments, and totally eliminate any separation of the nonorientated fibers in the fabric material to prevent the entanglement of the drum brush bristles in the synthetic hairlike fibers that form on the fabric surface.

SUMMARY OF THE INVENTION

The present invention provides for a lamination comprising an upper fabric layer made of nonorientated polyester fibers, a lower plastic layer, and a substance which, when applied to the fabric, creates a seal on the surface and impregnates the material acting to further create a bond among the fibers. This combination of elements thus precludes delamination of the polyester fibers, particularly when the fabric surface is exposed to the constant pounding of drumsticks or the continuous circular or sweeping motion of a drum brush.

The preferred combination of elements that constitute the present invention includes a fabric layer comprised essentially of spunbonded polyester and a coating of a vinylidene chloride copolymer in a colloidal emulsion state. The spunbonded polyester has an exceptionally high degree of absorbency to liquids. Thus, the emulsified vinylidene chloride copolymer not only coats the polyester fabric surface, it deeply impregnates the underlying randomly orientated fibers as well. The copolymer is also absorbed by the polyester fibers to create a bonded surface that is not only water and gas repellent, but more importantly extremely resistant to delamination.

Properties of vinylidene chloride copolymer include, among others, high tensile and tear strength and its resistance to moisture, temperature, sunlight, chemicals and abrasion. The copolymer's principal contribution to the present invention, however, derives from the crystalline nature of the compound itself and the exceptional ease with which it bonds tightly to the polyester fibers to prevent delamination. When applied, the copolymer penetrates the surface of the polyester fabric, impregnating the fibrous layers where it dries to a hard resin, totally sealing the surface and tightly bonding the layers and fibers together.

Accordingly, an object of the present invention is to provide a laminated head of a drum or similar musical instrument that precludes delamination of the nonorientated fibers in the synthetic fabric material.

Another object of the present invention is to provide a laminated head of a drum or similar musical instrument that precludes delamination of the nonorientated fibers in the synthetic fabric material while maintaining the integrity of the brush surface and brush response.

Still another object of the present invention is to provide a laminated head of a drum or similar musical instrument that precludes delamination of the synthetic fabric material without detracting from the tonal quality of the drumhead.

Still another object of the present invention is to provide a laminated head of a drum or similar musical instrument that precludes delamination of the synthetic fabric material by application of a chemical compound that seals the fabric surface and penetrates the same surface to impregnate the fibrous layers and bind the nonorientated fibers therein.

Still yet another object of the present invention is to provide a laminated head of a drum or similar musical instrument that precludes delamination of the synthetic fabric material that can be easily and efficiently manufactured.

Other objects and advantages of the present invention will become apparent in the following specifications when considered in light of the attached drawings wherein a preferred embodiment of the invention is illustrated.

A BRIEF DESCRIPTION OF THE DRAWINGS

FIG. 1 is a perspective view of the present invention showing a laminated drumhead 2 having a top or polyester fabric layer 4 impregnated with a vinylidene chloride copolymer 6, a bottom or plastic layer 10, all mounted on hoop 8.

FIG. 2 is a cross-sectional view of the present invention showing the laminated layers a drumhead 2, including the top polyester fabric layer 4 and a bottom plastic layer 10, and the vinylidene chloride copolymer 6 impregnated into the nonorientated polyester fibrous layers of the fabric layer 4. Adhesive layer 5 bonds the two principal layers together.

FIG. 3 is a cross-sectional view of an alternative embodiment of the present invention showing a top layer of vinylidene chloride copolymer 12 applied directly to a bottom plastic layer 10.

DETAILED DESCRIPTION OF THE PREFERRED EMBODIMENT

Figure 1:
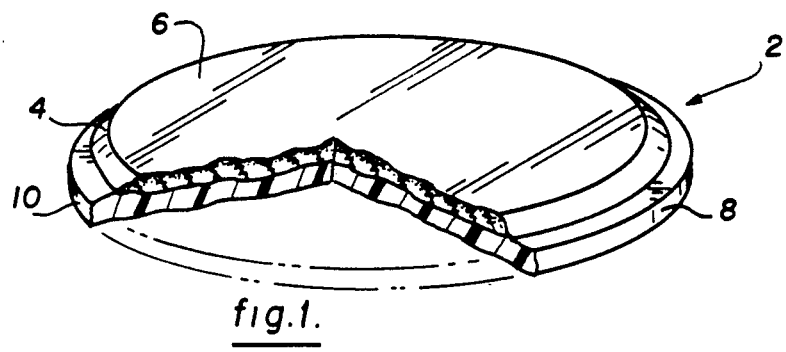
Figure 2:
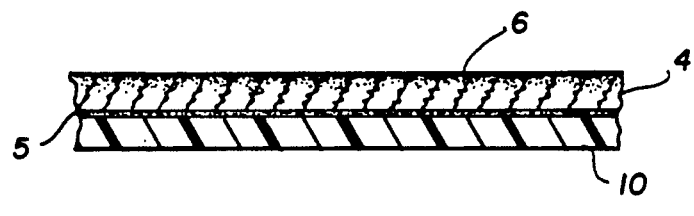

Referring more particularly to the drawings, FIG. 1 is a perspective view of the present invention depicting a laminated head of a drum or similar musical instrument comprising a top synthetic fabric layer 4 made of spunbonded polyester, a vinylidene chloride copolymer 6, which is applied to the surface of and impregnates and bonds the nondirectional polyester fibers of fabric layer 4, and a bottom plastic layer 10.

The vinylidene chloride copolymer may have the following typical properties; pH 9.0; specific gravity (latex form) 1.26; and specific gravity (solid form) 1.66.

The spunbonded polyester fabric layer contains filament polyester fibers that are randomly arranged, highly dispersed and bonded at the filament junction. One such example of this type of polyester product is sold under the brand name REEMAY. This and other spunbonded polyester products combine the chemical and thermal properties of polyester fibers with the spunbonded structure to give them many outstanding features. These include high tensile strength, high elongation to break, excellent tear strength and a high resistance to water and chemicals.

As discussed, the application of vinylidene chloride copolymers on fabric materials, such as spunbonded olefins which were previously utilized in the prior art to form the laminate, demonstrated an obvious weakness in the bonding of the copolymer with the high-density polyethylene fibers leading to excessive delamination of the surface filaments. Tonal qualities of the instrument, thus, were disturbed. Use of the drum brush also became extremely difficult, if not impossible, as the bristles get caught up in the delaminated fibers sticking up from the surface.

In practice then, a colloidal emulsion of vinylidene chloride copolymer 6 in a water base is applied to the top polyester fabric layer after the two layers are laminated together by any conventional means. The vinylidene chloride is normally applied to the surface of the fabric layer using a sponge, squeegee instrument or similar type of applicator and allowed to penetrate the individual polyester fibers and fibrous layers of the fabric. Applied heat to the copolymer can facilitate its penetration into the fibrous layers. The copolymer then dries to a hard resin forming a sealer on the surface of the polyester fabric. The crystalline structure of the copolymer acts to firmly bind the polyester fibers and fibrous layers together. This stabilizes the fibers in the fabric material and precludes delamination and separation when subjected to the constant pounding of the drumsticks and continuous circular or sweeping motion of a drum brush. Isopropyl alcohol may be added to the copolymer to accelerate the drying after the copolymer is applied.

Figure 3:
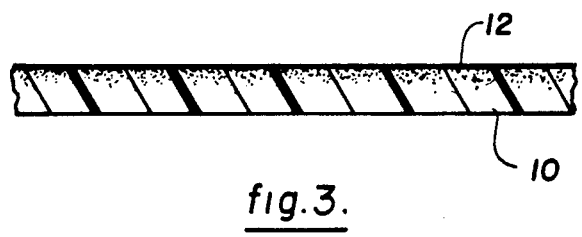

An alternative embodiment of the present invention is shown in FIG. 3 and comprises a drumhead constructed of a single bottom plastic layer 10 to which is applied a thin coating of vinylidene chloride copolymer 6. Copolymer 6 thus also serves as a substitute for the fabric material. The principal advantage is that the copolymer performs virtually the same function as the fabric material at a substantially reduced production cost while maintaining the tonal quality of the drumhead.

While the invention will be described in connection with a certain preferred embodiment, it is to be understood that it is not intended to limit the invention to that particular embodiment. Rather, it is intended to cover all alternatives, modification and equivalents as may be included within the spirit and scope of the invention as defined by the appended claims.

What is claimed is:

1. A head for a drum or similar musical instrument comprising, a synthetic plastic sheet material laminated to a polyester fabric material having a random fiber orientation, and a means applied to said fabric material to preclude delamination of said randomly orientated polyester fibers when said head is subjected to the constant beating or pounding of a drum stick or continuous circular motion of a drum brush upon its surface.

2. The head of claim 1 wherein said means applied to said polyester fabric material to preclude delamination of said randomly orientated polyester fibers constitutes a vinylidene chloride copolymer.

3. The head of claim 1 wherein said means applied to said polyester fabric material to preclude delamination of said randomly orientated polyester fibers constitutes polyvinylidene chloride.

4. The head of claim 1 wherein said means applied to said polyester fabric material to preclude delamination of said randomly orientated polyester fibers constitutes a colloidal emulsion of a vinylidene chloride copolymer.

5. The colloidal emulsion of a vinylidene chloride copolymer, as in claim 4, applied in latex form.

6. The head of claim 1 wherein said means applied to said polyester fabric material to preclude delamination of said randomly orientated polyester fibers is adapted to seal the surface of said fabric and impregnate said fibers and bond them together.

7. The head of claim 1, wherein said means to preclude delamination of said randomly orientated polyester fibers is applied to said fabric material after the lamination of said fabric to said plastic sheet material.

8. A head for a drum or similar musical instrument comprising a vinylidene chloride layer and a synthetic plastic layer bonded thereto.

* * * * *